United States Patent
Vichare et al.

(10) Patent No.: US 8,914,659 B2
(45) Date of Patent: Dec. 16, 2014

(54) SAFE UNATTENDED WAKE SYSTEM

(75) Inventors: Nikhil M. Vichare, Austin, TX (US); Adolfo Sandor Montero, Pflugerville, TX (US); Edwin Coleman Tinsley, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 13/355,190

(22) Filed: Jan. 20, 2012

(65) Prior Publication Data

US 2013/0191668 A1 Jul. 25, 2013

(51) Int. Cl.
*G06F 1/00* (2006.01)
*G06F 1/32* (2006.01)

(52) U.S. Cl.
USPC .............................. 713/323; 713/310; 713/320

(58) Field of Classification Search
CPC ..................................................... G06F 1/3203
USPC .......................................................... 713/323
See application file for complete search history.

(56) References Cited

U.S. PATENT DOCUMENTS

| | | | |
|---|---|---|---|
| 6,186,400 B1 * | 2/2001 | Dvorkis et al. | 235/462.45 |
| 7,308,587 B2 * | 12/2007 | Inui et al. | 713/310 |
| 7,382,567 B2 | 6/2008 | Liao et al. | |
| 7,450,332 B2 | 11/2008 | Pasolini et al. | |
| 7,733,238 B2 * | 6/2010 | Leone et al. | 340/669 |
| 7,845,228 B2 * | 12/2010 | Bremer et al. | 73/510 |
| 8,074,016 B2 | 12/2011 | Ahmad et al. | |
| 8,135,381 B2 * | 3/2012 | Ikeda et al. | 455/405 |
| 8,405,505 B2 * | 3/2013 | Desai et al. | 340/539.3 |
| 2005/0164633 A1 * | 7/2005 | Linjama et al. | 455/41.2 |
| 2007/0130378 A1 * | 6/2007 | Lin et al. | 710/15 |
| 2008/0144270 A1 * | 6/2008 | Dal Porto et al. | 361/684 |
| 2009/0021858 A1 | 1/2009 | Fu et al. | |
| 2009/0268334 A1 | 10/2009 | Nojiri et al. | |
| 2010/0290149 A1 | 11/2010 | Ahmad et al. | |

* cited by examiner

*Primary Examiner* — Suresh Suryawanshi
(74) *Attorney, Agent, or Firm* — Haynes and Boone, LLP

(57) ABSTRACT

An information handling system (IHS) includes a chassis. A processor is located in the chassis. A memory is located in the chassis and coupled to the processor. A disk drive is located in the chassis and coupled to the processor. An accelerometer is located in the chassis. A controller is located in the chassis and coupled to the accelerometer. The controller is operable, in response to a wake indicator signal associated with an IHS wake operation, to use the accelerometer to determine that the movement of the IHS exceeds a threshold and, in response, prevent the IHS wake operation such that operation of the disk drive is not initiated.

13 Claims, 5 Drawing Sheets

SAFE UNATTENDED WAKE SYSTEM

BACKGROUND

The present disclosure relates generally to information handling systems (IHSs), and more particularly to a safe unattended wake system for an IHS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Conventional IHSs typically implement power-saving schemes such as, for example, schemes according to the Advanced Configuration and Power Interface (ACPI) specification, that power down the IHS to some reduced power state in order to conserve power when the IHS is not being used. For example, the ACPI specification includes a number of states such as working states (e.g., G0 or S0), sleeping states (e.g., G1, S1, S2, S3, or S4), soft off states (e.g., G2 or S5), and mechanical off states (e.g., G3). However, IHSs are also currently implementing always on, always connected (AOAC) systems that allow the IHS to wake from a reduced power state unattended (e.g., without intervention from an IHS user) to, for example, retrieve IHS data and/or other system information such that IHS information in the IHS is up to date when the IHS user decides to use the IHS. The implementation of AOAC systems in the IHS raises a number of issues.

One issue that AOAC systems raise includes a risk of damage to IHS components. For example, if an unattended wake is performed on an IHS while the IHS is in a vibration and/or shock environment (e.g., carried by a user, in the trunk of a car, stored on a plane, etc.), that vibration and/or shock may be transmitted to hard disk drives (HDDs) in the IHS. This vibration and/or shock can cause damage to the HDD such as, for example, damage to the HDD platter and/or crashing of the heads that can lead to loss of data, warranty costs, and a bad customer experience. Such HDD damage is typically prevented using shock and free fall sensors that are integrated into the HDD. However, the HDD and its integrated sensors do not receive power in reduced power states, which allows the IHS to wake from the reduced power state, operate the HDD (e.g., spin the platter(s), actuate the heads, etc.), and cause the damage discussed above.

Accordingly, it would be desirable to provide an improved wake system.

SUMMARY

According to one embodiment, an information handling system (IHS) includes a chassis, a processor located in the chassis, a memory located in the chassis and coupled to the processor, a disk drive located in the chassis and coupled to the processor, an accelerometer located in the chassis, and a controller located in the chassis and coupled to the accelerometer, wherein the controller is operable, in response to a wake indicator signal associated with an IHS wake operation, to use the accelerometer to determine that the movement of the IHS exceeds a threshold and, in response, prevent the IHS wake operation such that operation of the disk drive is not initiated.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
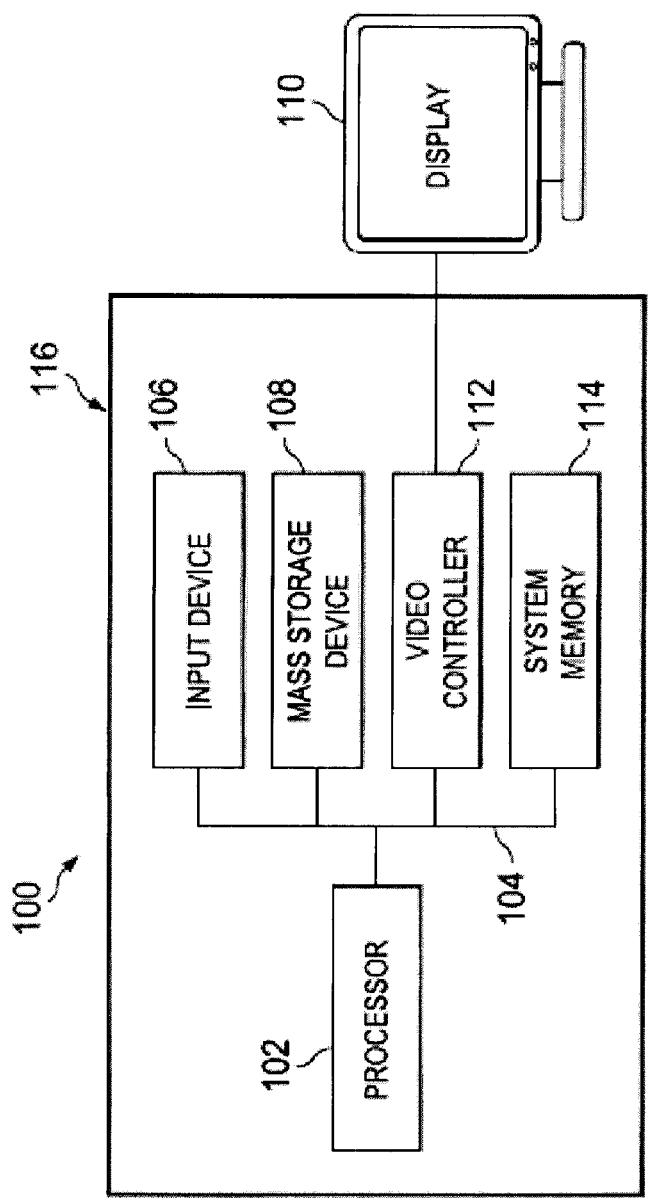
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
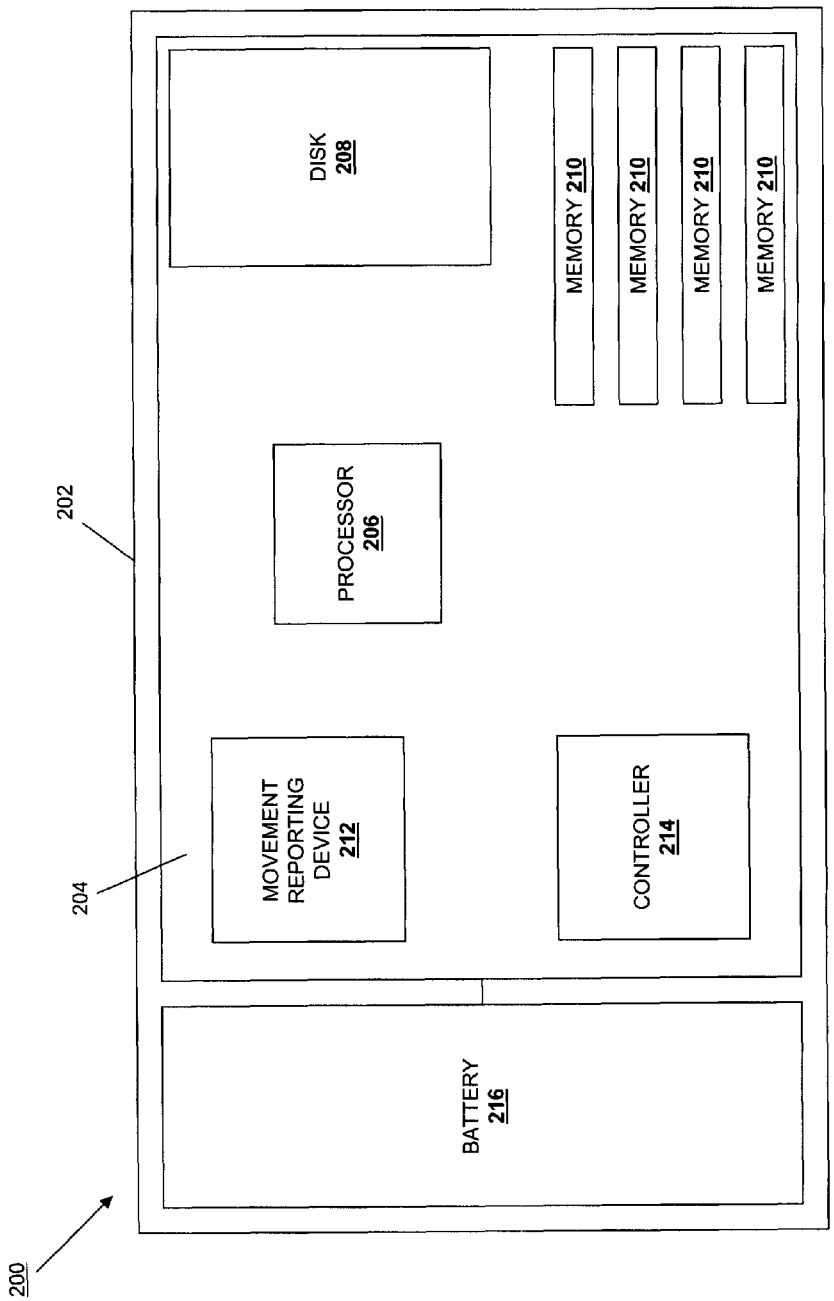
FIG. 2 is a schematic view illustrating an embodiment of an information handling system.

Referring now to FIG. 2, an IHS 200 is illustrated. In an embodiment, the IHS 200 may be the IHS 100, discussed above with reference to FIG. 1, and may include some or all of the IHS components described above. The IHS 200 includes a chassis 202 that may be, for example, the chassis 116, discussed above with reference to FIG. 1. The IHS 200 also includes a board 204 such as, for example, a circuit board, a motherboard, and/or a variety of other boards known in the art, that is located in the chassis 202. A plurality of components are coupled to the board 204. In the illustrated embodiment, a processor 206 which may be, for example, the processor 102 discussed above with reference to FIG. 1, is coupled to the board 204. In the illustrated embodiment, a disk 208 such as, for example, a hard disk drive, is coupled to the board 204 and to the processor 206 through the board 204. In the illustrated embodiment, a plurality of memory modules 210 such as, for example, a Dual Inline Memory Modules (DIMMs), are coupled to the board 204 and to the processor 206 through the board 204. In the illustrated embodiment, a movement reporting device 212 is coupled to the board 204 and to the processor 206 through the board 204. The movement reporting device 212 may include, for example, an accelerometer, a sound sensor such as an acoustic sensor, an opacity sensor such as an optical sensor, infrared sensor, and/or video image processor, a geomagnetic sensor such as a magnetic sensor or magnetometer, a transmitted energy reflection sensor such as an infrared laser radar, an ultrasonic sensor, and/or a microwave radar sensor, an electromagnetic induction sensor such as an inductive-loop detector, a vibration sensor such as a triboelectric sensor, a seismic sensor, and/or an inertia-switch sensor, and/or a variety of other movement reporting devices known in the art. In an embodiment, the movement reporting device 212 may be implemented as a discrete component on the board 204. In the illustrated embodiment, a controller 214 such as, for example, an embedded controller, is coupled to the board 204 and to the processor 206 through the board 204. In an embodiment, the movement reporting device 212 may be coupled to the controller 214 through a bus such as, for example, via a System Management Bus (SMBus) and/or other communications bus known in the art. In the illustrated embodiment, a battery 216 is coupled to the board 204 and operable to provide power to the components that are coupled to the board 204. While a plurality of components and relationships between components has been described, one of skill in the art will recognize that a wide variety of components and components connections may be provided in the IHS 200 without departing from the scope of the present disclosure.

Figure 3:
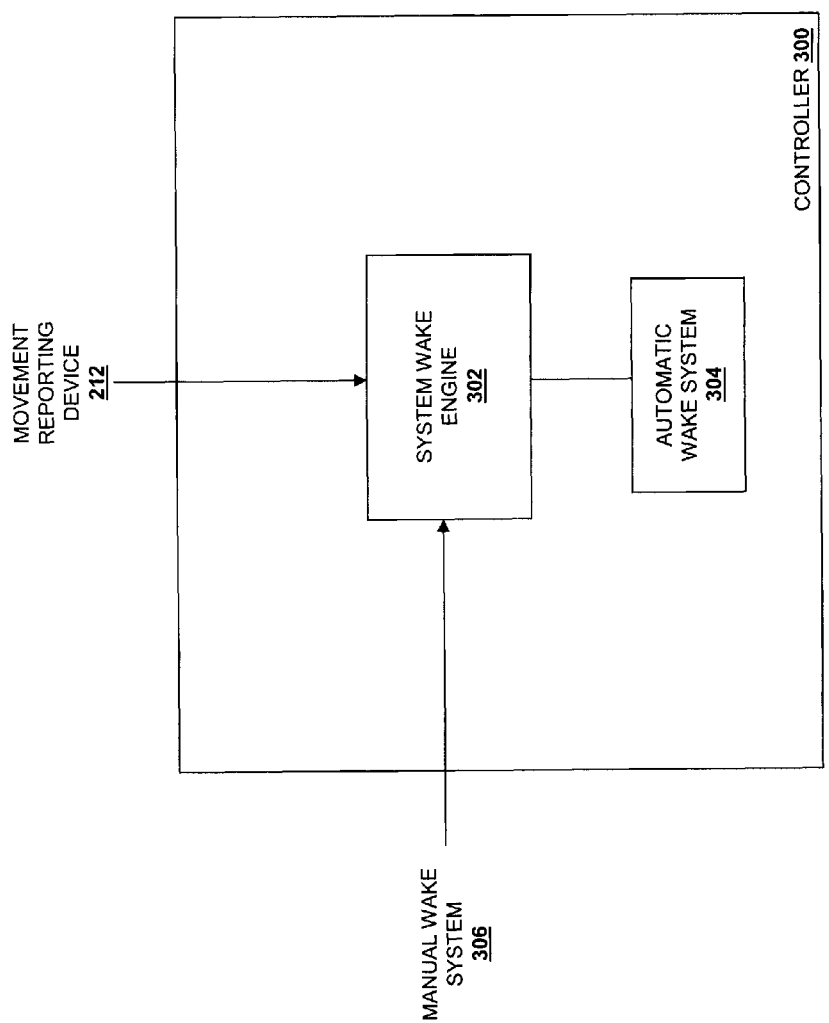
FIG. 3 is a schematic view illustrating an embodiment of a controller used in the information handling system of FIG. 2.
Figure 4:
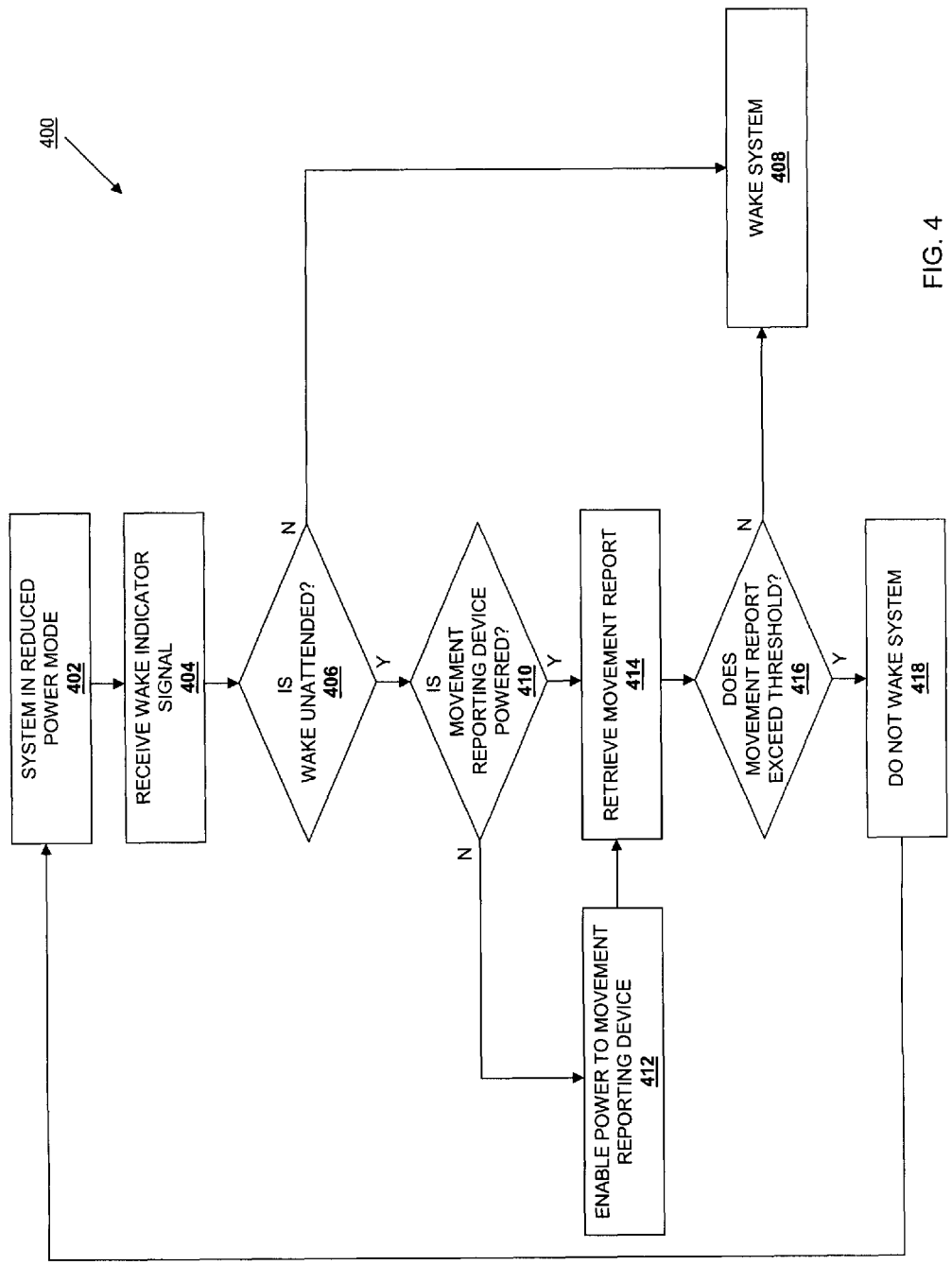
FIG. 4 is a flow chart illustrating an embodiment of a method for providing a safe unattended wake of the information handling system of FIGS. 2 and 3.

Referring now to FIG. 3, a controller 300 is illustrated. In an embodiment, the controller 300 may be the controller 214, discussed above with reference to FIG. 1. In an embodiment, the controller 300 may include or be coupled to a non-transient, computer-readable medium. The controller 300 includes a system wake engine 302 that may include instructions stored on a computer-readable medium that, when executed by a processor (e.g., the processors 102, the processor 206, a processor included in the controller (not illustrated), and/or a variety of other processors known in the art), cause the processor to perform the operations described below with regard to the functionality of the system wake engine 302. In the illustrated embodiment, the movement reporting device 212, discussed above with reference to FIG. 2, is coupled to the system wake engine 302 through the coupling of the movement reporting device 212 and the controller 214/300 through the board 204. However, the movement reporting device 212 may be coupled to the system wake engine 302 in a variety of different manners without departing from the scope of the present disclosure. An automatic wake system 304 is included in the controller 300 and coupled to the system wake engine 302. In an embodiment, the automatic wake system 304 includes instructions stored on a computer-readable medium that, when executed by a processor (e.g., the processors 102, the processor 206, a processor included in the controller (not illustrated), and/or a variety of other processors known in the art), cause the processor to perform the operations described below with regard to the functionality of the automatic wake system 304. A manual wake system 306 is coupled to the system wake engine 302 through the controller 300. In an embodiment, the manual wake system 306 may include a physical power button that is coupled to the controller 214/300 and the system wake engine 302 through the board 204. However, a variety of other manual wake systems may be provided without departing from the scope of the present disclosure.

Referring now to FIGS. 1, 2, 3, and 4, a method 400 for providing a safe unattended wake of an IHS is illustrated. The method 400 begins at block 402 where a system is in a reduced power mode. In an embodiment, the IHS 100/200 may be placed in a reduced power mode such as, for example, a reduced power mode according to the Advanced Configuration and Power Interface (ACPI) specification, such that the IHS may conserve power when the IHS is not being used. For example, the ACPI specification includes a number of states such as working states (e.g., G0 or S0), sleeping states (e.g., G1, S1, S2, S3, or S4), soft off states (e.g., G2 or S5), and mechanical off states (e.g., G3). In the embodiment discussed below, the IHS 100/200 is described as being in the S3 sleeping state at block 402 of the method 400. However, one of skill in the art will recognize that a variety of other reduced power states may benefit from the teachings of the present disclosure.

The method 400 then proceeds to block 404 where a wake indicator signal is received. In an embodiment a wake indicator signal may be received by the controller 214/300, which remains powered while the IHS 100/200 is in the S3 sleeping state. In an embodiment, the wake indicator signal is received by the system wake engine 302 in the controller 214/300. The method 400 then proceeds to decision block 406 where it is determined whether a system wake operation associated with the wake indicator signal is unattended. In an embodiment, the system wake engine 302 is operable to determine whether the wake indicator signal received in block 404 of the method 400 was received from the automatic wake system 304 or the manual wake system 306. In an embodiment, the IHS 100/200 includes an always on, always connected (AOAC) system that allows the IHS 100/200 to wake from the reduced power state unattended (e.g., without intervention from the user of the IHS 100/200) to, for example, retrieve IHS data and/or other system information such that IHS information in the IHS is up to date when the IHS user decides to use the IHS. For example, the IHS 100/200 with an AOAC system may wake from a reduced power state, update applications included in the IHS 100/200, and then return to the reduced power state. The AOAC system includes the automatic wake system 304 that is operable to send the wake indicator signal to the system wake engine 302. In an embodiment, a wake indicator signal from the automatic wake system 304 may be sent in response to a timer (e.g., a predefined intervals), a received network packet (e.g., a packet received by the IHS 100/200 from a cell network, a wifi network, a Bluetooth network, and/or variety of other networks known in the art), and/or in response to a variety of other automatic wake triggers known in the art. Further, as is known in the art, the manual wake system 306 may be actuated by a user of the IHS 100/200 in order to send the wake indicator signal to the system wake engine 302.

If, at decision block 406, it is determined that the system wake operation associated with the wake indicator signal received in block 404 is not unattended, the method 400 proceeds to block 408 where the system wake operation is performed. For example, the system wake engine 302 may determine that the system wake operation associated with the wake indicator signal is not unattended in response to determining that the wake indicator signal was received from the manual wake system 306 and, in response, cause the controller 214/300 to wake the IHS 100/200 from the S3 sleeping state to a higher power state such as, for example, the G0 or S0 working states. As discussed above, while specific reduced power and working states have been described, the system wake operation may include any increase from a first power state to a second power state that allows for a higher functionality of the IHS 100/200 relative to the first power state. Furthermore, while a manual wake system 306 has been described as providing the wake indicator signal that is associated with an attended system wake operation, one of skill in the art will recognize that other wake systems may be used to provide a wake indicator signal that is associated with an attended system wake operation while remaining within the scope of the present disclosure.

If, at decision block 406, it is determined that the system wake operation associated with the wake indicator signal received in block 404 is unattended, the method 400 proceeds to decision block 410 where it is determined whether the movement reporting device is powered. For example, the system wake engine 302 may determine that the system wake operation associated with the wake indicator signal is unattended in response to determining that the wake indicator signal was received from the automatic wake system 304 and, in response, the method 400 proceeds to decision block 410. While an automatic wake system 304 is described as providing the wake indicator signal that is associated with unattended system wake operation, one of skill in the art will recognize that other wake systems may be used to provide a wake indicator signal that is associated with an unattended system wake operation while remaining within the scope of the present disclosure.

In some embodiments, the movement reporting device 212 may be continuously powered when the IHS 100/200 is in the reduced power state. In other embodiment, the movement reporting device 212 may be periodically powered on when the IHS 100/200 is in the reduced power state. For example, the movement reporting device 212 may be periodically powered on a predefined intervals that are known to the controller 214/300 and/or the system wake engine 302. In other embodiments, the controller 214/300 may be operable to supply power to the movement reporting device 212. In an embodiment, the movement reporting device 212 may be coupled to a power rail that is controlled by a General Purpose Input/Output (GPIO) on the controller 214/300 or another controller in the IHS 100/200 to avoid supplying power to the movement reporting device 212 then entire time the IHS 100/200 is in the reduced power state. One of skill in the art will recognize that a variety of power schemes, other than those described above, may be used to power the movement reporting device 212 while remaining within the scope of the present disclosure.

If at decision block 410 of the method 400, it is determined that the movement reporting device is not powered, the method 400 proceeds to block 412 where power to the movement reporting device is enabled. For example, the system wake engine 302 may determine that the movement reporting device 212 is not receiving power through the coupling of the movement reporting device 212 and the controller 214/300 and, in response, power may be enabled to the movement reporting device 212. As discussed above, the controller 214/300 may be operable to supply power to the movement reporting device 212, and thus the system wake engine 302 may instruct the controller 214/300 to provide power to the movement reporting device 212 at block 412 of the method 400. As also discussed above, the movement reporting device 212 may be periodically powered on a predefined intervals that are known to the controller 214/300 and/or the system wake engine 302, and at decision block 410 and block 412 of the method 400, the determination that the movement reporting device 212 is not receiving power may simply include the controller 214/300 and/or the system wake engine 302 recognizing that the movement reporting device 212 is currently in an interval that it does not receive power, while the enabling power to the movement reporting device 212 may include the movement reporting device 212 entering an interval where power is provided to the movement reporting device 212.

If, at decision block 410, it is determined that the movement reporting device is powered, or upon power being enabled to the movement reporting device 212 at block 412 of the method 400, the method 400 proceeds to block 414 where a movement report is retrieved. For example, the system wake engine 302 may retrieve a movement report from the movement reporting device through the coupling of the movement reporting device 212 and the controller 214/300. In an embodiment, the movement reporting device 212 includes an accelerometer, and the movement report may include a vibration response determined by the accelerometer in terms of Gravitational (G) force loads experienced by the IHS 100/200. For example, the movement report may include a peak G force load, an average G force load, a root mean square of the G force load ($G_{rms}$), and/or a variety of other G force measurements known in the art. While a plurality of movement reports for an accelerometer have been described, one of skill in the art will recognize that movement reports from sound sensors, opacity sensors, geomagnetic sensors, transmitted energy reflection sensors, electromagnetic induction sensors, a vibration sensors, and/or a variety of other movement reporting devices will fall within the scope of the present disclosure.

The method 400 then proceeds to decision block 416 where it is determined whether the movement report retrieved in block 414 of the method exceeds a threshold. In an embodiment, the system wake engine 302 includes one or more predefined threshold values that are associated with the maximum amount of movement the IHS 100/200 that is considered safe with regard to the waking of the IHS 100/200 and/or the operation of the IHS components immediately following a reduced power state. For example, the predetermined threshold values may include a predetermined peak G force load, a predetermined average G force load, a predetermined $G_{rms}$, and/or a variety of other predetermined threshold values know in the art. As discussed above, the disk 208 may include a hard disk drive that includes platters, heads, and/or other hard disk drive components. One of skill in the art will recognize that operation of a hard disk drive in a vibration and/or shock environment can cause damage to the HDD such as, for example, damage to the HDD platter and/or crashing of the heads. For example, a hard disk drive in an IHS implementing an AOAC system may be able, in response to a wake of the IHS in a high vibration and/or shock environment, spin the platters, operate the heads, etc., and incur damage before any integrated sensors in the hard disk drive receive power and are operable to prevent operation of the hard disk drive in the high vibration and/or shock environment. Furthermore, while such HDD damage is typically prevented using shock and free fall sensors that are integrated into the HDD, the HDD and its integrated sensors will not receive power when the IHS 100/200 is in the reduced power state, which allows conventional systems to wake the IHS 100/200 from the reduced power state, operate the HDD (e.g., spin the platter(s), actuate the heads, etc.), and cause the damage. However, the predetermined threshold value(s) included in the system wake engine 302 may be selected such that the system wake engine 212 will only perform the system wake operation that is associated with the wake indicator signal received in block 404 of the method 400 if the movement report retrieved in block 414 of the method 400 does not exceed the predetermined threshold value(s).

Thus, if at decision block 416, it is determined that the movement report does not exceed a threshold, the method 400 proceeds to block 408 where the system wake operation associated with the wake indicator signal received at block 404 of the method 400 is performed. Similarly as discussed above for an attended wake, in response to the system wake engine 302 determining that the information included in the movement report is below the predetermined threshold value(s), the system wake engine 212 may cause the controller 214/300 to wake the IHS 100/200 from the S3 sleeping state to a higher power state such as, for example, the G0 or S0 working states. As also discussed above, while specific reduced power and working states have been described, the system wake operation may include any increase from a first power state to a second power state that allows for a higher functionality of the IHS 100/200 relative to the first power state.

Furthermore, if at decision block 416, it is determined that the movement report exceeds a threshold, the method 400 proceeds to block 418 where the system wake operation associated with the wake indicator signal received at block 404 of the method 400 is not performed. For example, if the system wake engine 212 determines that the information included in the movement report is at or above the predetermined threshold value(s), the system wake engine 212 will not cause the controller 214/300 to wake the IHS 100/200 from the reduced power state to a higher power state, thus preventing the possibility of damage to IHS components, such as the hard disk drive that may be damaged if operated in a vibration and/or shock environment as discussed above. The method 400 then returns to block 402 where the IHS 100/200 remains in the reduced power state until another wake indicator signal is received and the method 400 described above is repeated. While a specific example of a hard disk drive has been provided, one of skill in the art will recognize that other IHS components may benefit from the safe unattended wake system described above.

Thus, a system and method have been described that provide for unattended waking of an IHS only when the IHS is confirmed to be in an environment where such a wake will not risk damage to any IHS components in the IHS. In an embodiment, in response to an instruction to perform a system wake operation, the system and method determine whether the wake is unattended, determine the environment of the IHS, and then only wake the IHS from a reduced power state in response to a confirmation that the environment of the IHS includes vibration and/or shock levels that do not risk damage to any IHS components in the IHS.

Figure 5:
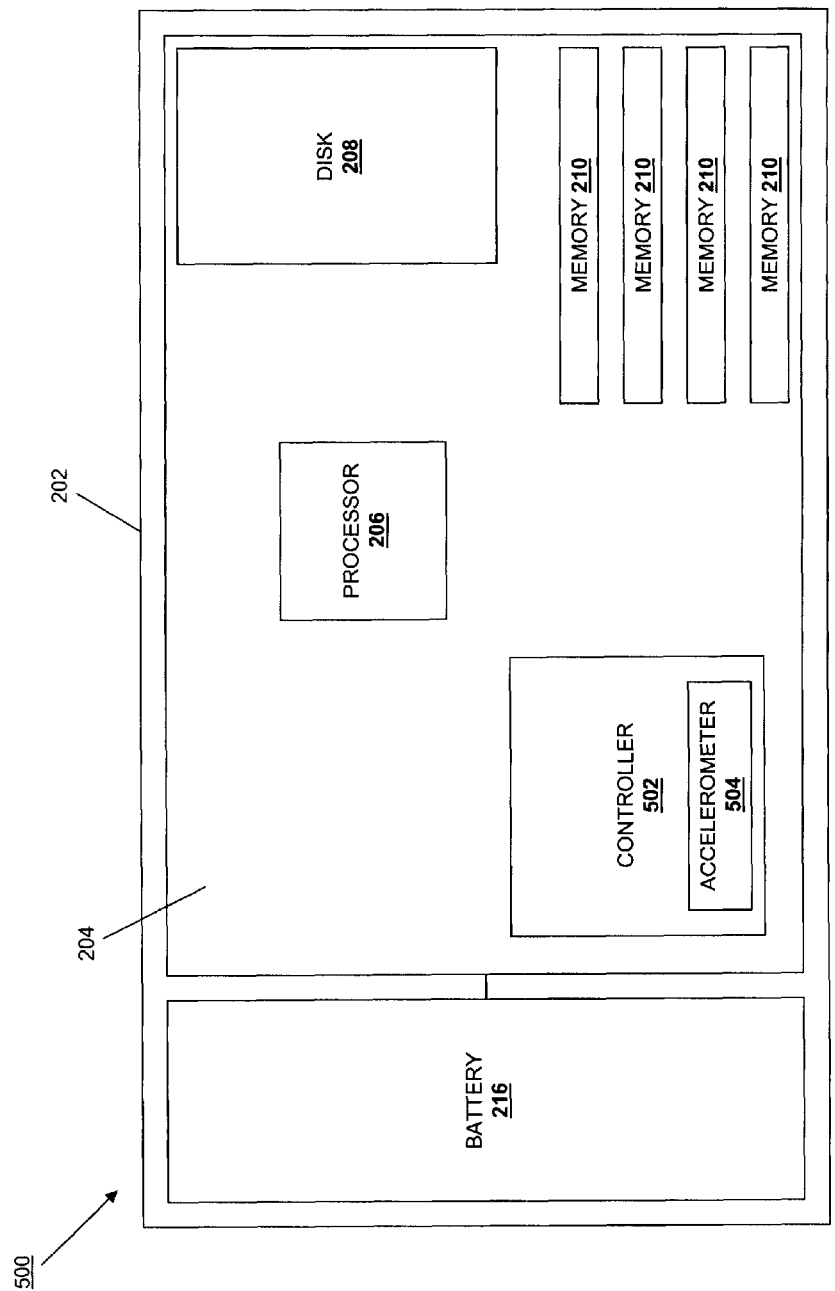
FIG. 5 is a schematic view illustrating an embodiment of an information handling system.

Referring now to FIG. 5, an embodiment of an IHS 500 is illustrated which is substantially similar to the IHS 200, discussed above with reference to FIG. 2, but with the provision of a modified controller 502 replacing the controller 214. The controller 502 includes an integrated accelerometer 504 on the controller 502. For example, the accelerometer 504 may be integrated on an embedded controller chip. Furthermore, the accelerometer 504 may be integrated on a controller that is a different controller than the controller that includes the system wake engine 212. While an accelerometer has been illustrated, a variety of other movement reporting devices may be integrated into the controller 502 without departing from the scope of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A safe unattended wake system, comprising:
  a chassis;
  a component located in the chassis;
  a movement reporting device located in the chassis, wherein the movement reporting device is continuously powered during a system reduced power state; and
  a controller that is located in the chassis, coupled to the movement reporting device, and continuously powered during the system reduced power state, wherein the controller is configured to;
    receive a wake indicator signal associated with a system wake operation,
    retrieve a movement report from the movement reporting device;
    determine the movement report exceeds a threshold, and
    prevent the system wake operation such that operation of the component is not initiated from the system reduced power state.

2. The system of claim 1, wherein the controller is further configured, in response to receiving the wake indicator signal, to determine whether the system wake operation is attended or unattended.

3. The system of claim 2, wherein in response to the system wake operation being attended, the controller is configured to enable the system wake operation, and wherein in response to the system wake operation being unattended, the controller is configured to retrieve the movement report and:
  prevent the system wake operation in response to the movement report exceeding the threshold; and
  enable the system wake operation in response to the movement report not exceeding the threshold.

4. The system of claim 1, wherein the movement reporting device is integrated into the controller.

5. The system of claim 1, further comprising:
  a board, wherein the movement reporting device is coupled to the controller through the board.

6. An information handling system (IHS), comprising:
  a chassis;
  a processor located in the chassis;
  a memory located in the chassis and coupled to the processor;

a disk drive located in the chassis and coupled to the processor;

an accelerometer located in the chassis, wherein the accelerometer is continuously powered during an IHS reduced power state; and a controller that is located in the chassis, coupled to the accelerometer, and continuously powered during the HIS reduced power state, wherein the controller is configured to:

receive a wake indicator signal associated with an IHS wake operation, use the accelerometer to determine that the movement of the IHS exceeds a threshold in response to receiving the wake indicator signal; and prevent the IHS wake operation in response to determining the movement of the HIS exceeds the threshold such that operation of the disk drive is not initiated from the IHS reduced power state.

7. The IHS of claim 6, wherein the controller is further configured, in response to the wake indicator signal, to determine whether the IHS wake operation is attended or unattended.

8. The IHS of claim 7, wherein in response to the IHS wake operation being attended, the controller is configured to enable the IHS wake operation, and wherein in response to the IHS wake operation being unattended, the controller is configured to:

prevent the IHS wake operation in response to determining that the movement of the IHS exceeds the threshold; and enable the IHS wake operation in response to determining that the movement of the IHS does not exceed the threshold.

9. The IHS of claim 6, wherein the accelerometer is integrated into the controller.

10. The IHS of claim 6, further comprising:

a board, wherein the accelerometer is coupled to the controller through the board.

11. A method for providing a safe unattended wake of an information handling system (IHS), comprising:

placing a IHS into a reduced power mode, wherein a movement reporting device and a controller in the IHS are both continuously powered in the reduced power mode;

receiving a wake indicator signal with the controller, wherein the wake indicator signal is associated with a IHS wake operation;

retrieving, by the controller in response to the wake indicator signal, a movement report from the movement reporting device;

preventing the IHS wake operation in response to the movement report exceeding a threshold; and enabling the IHS wake operation in response to the movement report not exceeding the threshold.

12. The method of claim 11, further comprising:

determining, by the controller in response to receiving the wake indicator signal, that the IHS wake operation is attended and, in response, enabling the IHS wake operation; and determining, by the controller in response to receiving the wake indicator signal, that the IHS wake operation is unattended and, in response:

retrieving, by the controller in response to the wake indicator signal, a movement report from a movement reporting device;

preventing the IHS wake operation in response to the movement report exceeding a threshold; and enabling the IHS wake operation in response to the movement report not exceeding the threshold.

13. The method of claim 11, wherein the IHS includes a chassis that houses the controller, the movement reporting device, and a disk drive that is separate from the movement reporting device, and wherein the preventing the IHS wake operation prevents operation of the disk drive from being initiated.

* * * * *